United States Patent
Ramachandran et al.

(10) Patent No.: US 11,281,571 B2
(45) Date of Patent: Mar. 22, 2022

(54) SYSTEM AND METHOD FOR VALIDATING CLOUD-NATIVE APPLICATIONS FOR A PRODUCTION-READY DEPLOYMENT

(71) Applicant: DELL PRODUCTS, LP, Round Rock, TX (US)

(72) Inventors: Venkat Ramachandran, Round Rock, TX (US); Navin Kumar N, Bangalore (IN); Panguluru Vijaya Sekhar, Bangalore (IN); Nagakalyan Kambapu, Austin, TX (US); Nikhil Reddy Kota, Round Rock, TX (US); Madhusudhana Reddy Chilipi, Leander, TX (US); Hung Dinh, Austin, TX (US); Puttaraju ChikkannaBommanna, Bangalore (IN); Nithiyanandham Tamilselvan, Salem (IN); Ravi R Shastri, Bangalore (IN); Nitya Seth, Allen, TX (US); Prasad Ts Rao, Bangalore (IN); Zishnu Deb Das, Kolkata (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/928,864

(22) Filed: Jul. 14, 2020

(65) Prior Publication Data

US 2022/0019524 A1    Jan. 20, 2022

(51) Int. Cl.
*G06F 9/44* (2018.01)
*G06F 9/455* (2018.01)
(Continued)

(52) U.S. Cl.
CPC ............ *G06F 11/3692* (2013.01); *G06F 8/61* (2013.01); *G06F 11/3608* (2013.01);
(Continued)

(58) Field of Classification Search
CPC ............ G06F 11/3692; G06F 11/3608; G06F 11/3664; G06F 11/3688; G06F 11/3696; G06F 8/61
See application file for complete search history.

(56) References Cited

U.S. PATENT DOCUMENTS 9,880,837 B2     1/2018   Khazanchi et al.
10,102,114 B1 *  10/2018  Jing .................... G06F 11/3692
(Continued)

OTHER PUBLICATIONS

Udi Nachmany (For Cloud-Native Applications, Testing In Production Goes From Punchline To Best Practice, Apr. 2020, pp. 1-6. https://www.forbes.com/sites/udinachmany/2020/04/02/for-cloud-native-applications-testing-in-production-goes-from-punchline-to-best-practice/ (Year: 2020).*
(Continued)

*Primary Examiner* — Mongbao Nguyen
(74) *Attorney, Agent, or Firm* — Larson Newman, LLP

(57) ABSTRACT

An information handling system includes a repository that stores a pre-production validation suite and a production validation suite. The pre-production validation suite includes first validation factors, and the production validation suite includes second validation factors. A processor may deploy an application in a pre-production environment, and validate the application in the pre-production environment using the pre-production validation suite. If the application passes the pre-production validation suite, then the processor may deploy the application in a production environment. The processor also may validate the application in the production environment using the production validation suite, assign a score associated with each one of the first validation factors and each one of the second validation factors, and generate a report based on the score associated with each one of the first validation factors and each one of the second validation factors.

17 Claims, 3 Drawing Sheets

(51) Int. Cl.
    *G06F 11/36*     (2006.01)
    *G06F 8/61*     (2018.01)

(52) U.S. Cl.
    CPC ...... *G06F 11/3664* (2013.01); *G06F 11/3688* (2013.01); *G06F 11/3696* (2013.01)

(56) References Cited

U.S. PATENT DOCUMENTS

| | | | |
|---|---|---|---|
| 10,209,974 B1* | 2/2019 | Patton | G06N 20/00 |
| 10,263,847 B2 | 4/2019 | Burk et al. | |
| 10,318,285 B1* | 6/2019 | Jodoin | G06F 8/60 |
| 10,684,941 B2* | 6/2020 | Adibowo | G06F 8/65 |
| 2009/0125413 A1* | 5/2009 | Le Chevalier | H04N 21/26258 705/26.1 |
| 2013/0174124 A1* | 7/2013 | Watters | G06F 8/71 717/122 |
| 2016/0378449 A1 | 12/2016 | Khazanchi et al. | |
| 2017/0371636 A1* | 12/2017 | Palavalli | G06F 9/5077 |
| 2018/0143891 A1* | 5/2018 | Polisetty | G06F 11/3006 |
| 2018/0173525 A1* | 6/2018 | Suparna | G06F 11/3688 |
| 2018/0300221 A1* | 10/2018 | Barbee | G06F 11/3006 |
| 2019/0171550 A1* | 6/2019 | Eizenman | G06F 11/3664 |
| 2019/0294525 A1* | 9/2019 | Scheiner | G06F 11/3608 |
| 2019/0294528 A1* | 9/2019 | Avisror | G06F 8/60 |
| 2019/0361688 A1* | 11/2019 | Chigakkagari | G06F 8/71 |
| 2020/0125485 A1* | 4/2020 | Wiener | G06F 11/3466 |
| 2020/0133830 A1* | 4/2020 | Sharma | G06Q 10/06312 |
| 2020/0192787 A1* | 6/2020 | Cauley | G06F 8/60 |
| 2020/0218623 A1* | 7/2020 | Zhang | G06F 8/658 |
| 2020/0310779 A1* | 10/2020 | Van Heuklon | G06F 8/65 |

OTHER PUBLICATIONS

Nikolaos Astyrakakis, Cloud-Native Application Validation & Stress Testing Through a Framework for Auto-Cluster Deployment, 2019, pp. 1-5. https://ieeexplore.ieee.org/stamp/stamp.jsp?tp=&arnumber=8858164 (Year: 2019).*

Narasimha Murthy MS, Software Testing and its Scope in Cloud: A Detailed Survey, 2017, pp. 269-273. https://ieeexplore.ieee.org/stamp/stamp.jsp?tp=&arnumber=7975617 (Year: 2017).*

* cited by examiner

SYSTEM AND METHOD FOR VALIDATING CLOUD-NATIVE APPLICATIONS FOR A PRODUCTION-READY DEPLOYMENT

FIELD OF THE DISCLOSURE

The present disclosure generally relates to information handling systems, and more particularly relates to validating cloud-native applications for a production-ready deployment.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a repository that stores a pre-production validation suite and a production validation suite. The pre-production validation suite includes first validation factors, and the production validation suite includes second validation factors. A processor may deploy an application in a pre-production environment, and validate the application in the pre-production environment using the pre-production validation suite. If the application passes the pre-production validation suite, then the processor may deploy the application in a production environment. The processor also may validate the application in the production environment using the production validation suite, assign a score associated with each one of the first validation factors and each one of the second validation factors, and generate a report based on the score associated with each one of the first validation factors and each one of the second validation factors.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
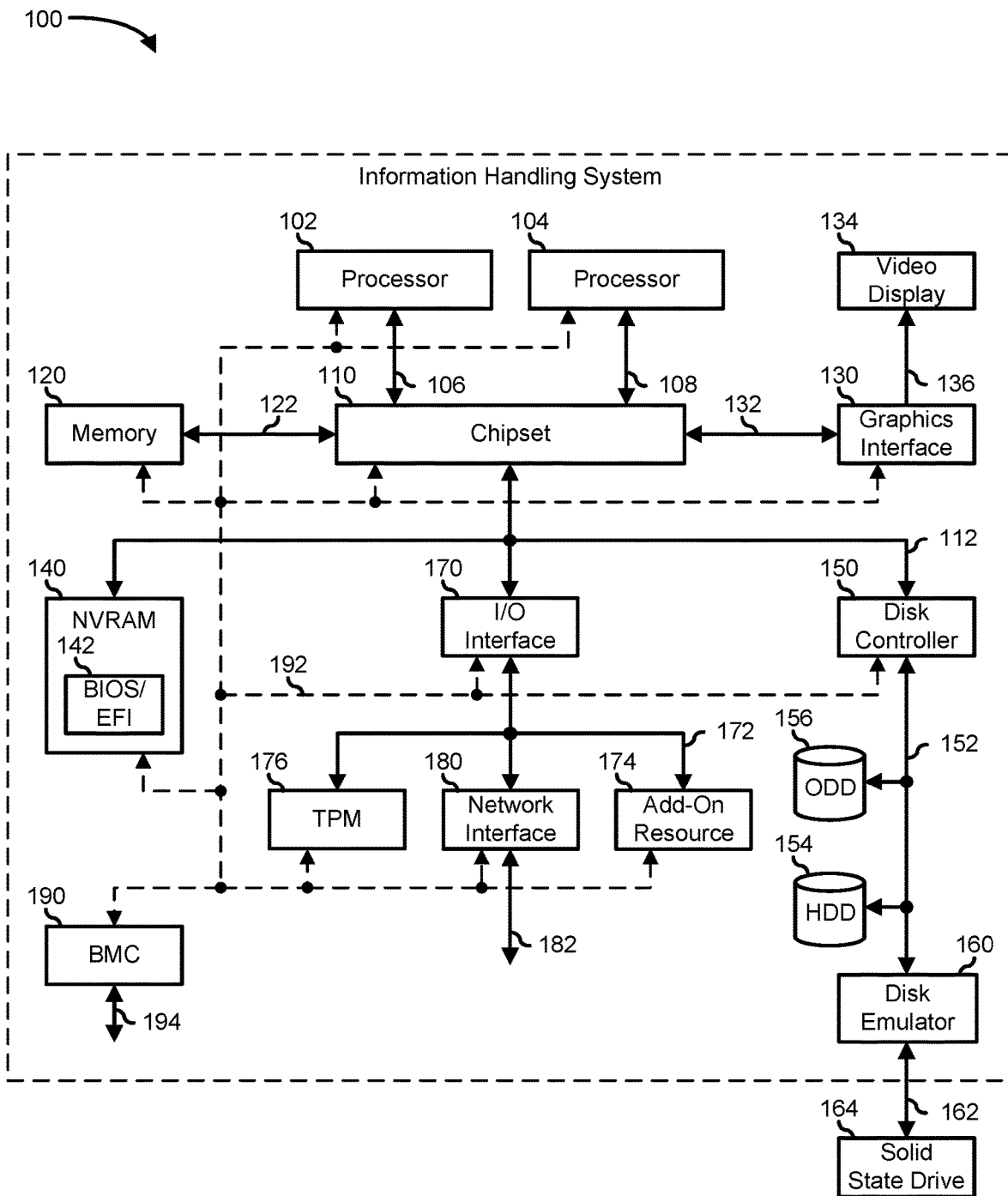
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM)

devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four lane (×4) PCIe adapter, an eight lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172 and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor defined interfaces (such as a Dell EMC Remote Access Controller Administrator (RACADM) utility, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple CPUs and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Enterprises have traditionally viewed application development and information technology (IT) operations as two separate specialized areas. The development team tested new applications in an isolated development environment for quality assurance and if certain development parameters were satisfied, the application was passed to the IT operations team. The operations team would then deploy and maintain the application. With this approach, there is usually a long delay between application releases. Modern applications typically require faster implementation based on cloud-native and development and operations (DevOps) practices. The cloud-native practice is about how applications are developed, released, and deployed. While the DevOps practice is about how software development and information-technology operations are combined. Because the software development team is not always aware of operational roadblocks encountered by the IT operations team, the software development team could not anticipate and prevent these operational roadblocks from occurring. This prevents the application from working as originally developed. The present disclosure addresses challenges associated with ensuring that the applications are developed, deployed, and working as originally developed.

Figure 2:
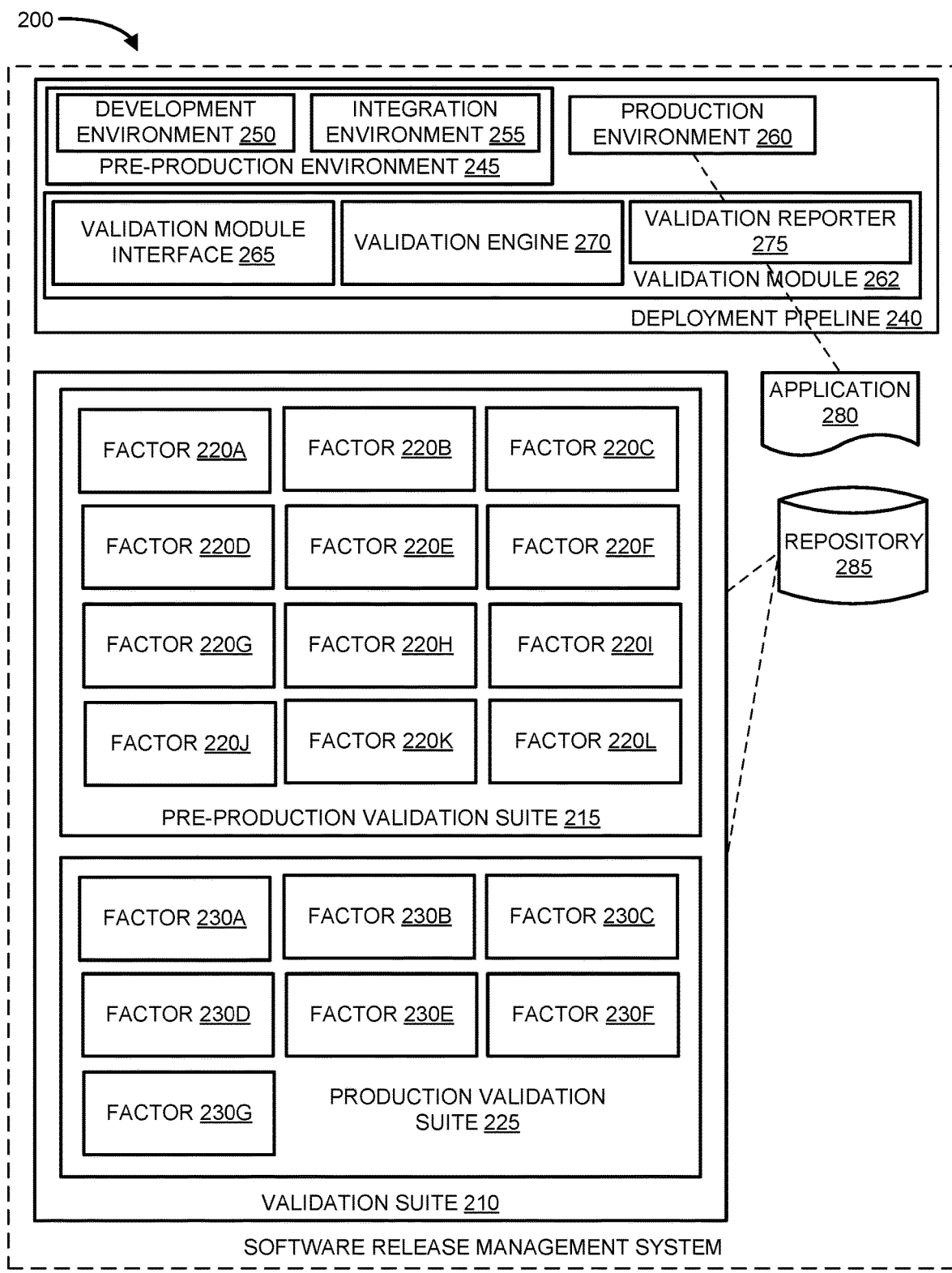
FIG. 2 is a block diagram illustrating an example of a system for validating cloud-native applications for a production ready deployment.

FIG. 2 shows a software release management system 200 in an information handling system similar to information handling system 100 of FIG. 1. Software release management system 200 that includes a validation suite 210, a deployment pipeline 240, and a repository 285, may be an enterprise framework for building production-grade services that are compliant to be run on a cloud-native platform. In particular software release management system 200 may be configured to validate if an application such as an application 280 is compliant to be run on a cloud-native platform based on cloud-native and DevOps principles.

Application 280 is a cloud-native application that has been designed and implemented to be run on a Platform-as-a-Service installation such as a loosely coupled microservices. The microservices may be developed using different languages and frameworks and generally utilize APIs for interaction and collaboration. Deployment pipeline 240 may be a continuous integration and continuous delivery (CI/CD) pipeline configured to deploy application 280 into multiple environments and to validate application 280 in each environment. Deployment pipeline 240 includes pre-production environment 245 and a production environment 260. Pre-production environment 245 includes a development environment 250 and an integration environment 255. The aforementioned environments may also represent stages in deployment pipeline 240.

The configuration of development environment 250 and integration environment 255 may be similar to the configuration of production environment 260. Each one of development environment 250, integration environment 255, and production environment 260 may be comprised of a host computer and/or virtual machines allocated for the deployment and validation of application 280. Components of application 280 may be installed on a single host and/or a virtual machine or distributed across multiple hosts and/or virtual machines in a multi-tier configuration. While deployment pipeline 240 is shown to have a series of environments, deployment pipeline 240 may include more or fewer environments. In addition, deployment pipeline 240 may include other types of environments such as a test environment, a user acceptance test environment, a staging environment, a load test environment, etc.

In one embodiment, one or more stages, such as testing and validation, may be performed against application 280 in each environment. If application 280 has been deployed and validated in one environment, then application 280 may be promoted to another environment. For example, if application 280 passed pre-production validation suite 215 in development environment 250 then application 280 may be promoted to integration environment 255. In addition, if application 280 passed pre-production validation suite 215 in integration environment 255, then application 280 may be promoted to production environment 260 where application 280 may be validated using production validation suites 225.

Validation module 262 may be configured to ensure that application 280 performs to one or more objectively verifiable benchmarks such as operational integrity and performance validation. Validation module 262 includes a validation module interface 265, a validation engine 270, and a validation reporter 275. Validation module interface 265 may be configured to issue a validation request to validation engine 270 to validate application 180 against one or more validation suites. The request may be issued using one of various protocols such as Representational State Transfer (REST) protocol, Simple Object Access Protocol (SOAP), Transport Control Protocol and Internet Protocol (TCP/IP), Hypertext Transfer Protocol (HTTP), etc. In addition, validation module interface 265 may use one or more data formats, such as Extensible Markup Language (XML), JavaScript Object Notation (JSON), electronic data interchange (EDI) formats, etc. For example, in one embodiment, validation module interface 265 may conform to certain constraints of (REST) and thus be considered a RESTful interface.

Validation engine 270 may be configured to perform validation tests on an application deployed in one or more environments of deployment pipeline 240 upon deployment of application 280 in one of the environments in deployment pipeline 240. Validation engine 270 may determine the validation suite to apply to application 280 and query repository 285 based on the determination. The determination may be based on the environment that application is deployed into, application 280's type, name, and/or identifier, etc. Validation suite 210 includes a pre-production validation suite 215 and a production validation suite 225. In addition to storing the aforementioned validation suites, repository 285 may also be configured to store various other data or information such as application 280, a codebase associated with application 280, reports generated by validation reporter 275, etc.

In one embodiment, validation engine 270 may be integrated as part of deployment pipeline 240. In another embodiment, validation engine 270 may be external to deployment pipeline 240 but integrated to software release management system 200. Validation engine 270 may be configured to apply policies, rules, and/or algorithms to determine whether application 280 adheres to pre-production validation suite 215 and production validation suite 225. In one embodiment, validation engine 270 may apply pre-production validation suite 215 to application 280 deployed in pre-production environment 245. Validation engine 270 may perform validation based on production validation suite 225 to application 280 deployed in production environment 260. Validation engine 270 may execute one or more validation suites at different stages of deployment pipeline 240.

Pre-production validation suite 215 and production validation suite 225 includes factors designed to determine whether application 280 adheres to DevOps principles and is cloud deployment ready. Pre-production validation suite 215 includes a factor 220A, a factor 220B, a factor 220C, a factor 220D, a factor 220E, a factor 220F, a factor 220G, a factor 220H, a factor 220I, a factor 220J, a factor 220K, and a factor 220L.

Factor 220A, also be referred to as a first factor, may be associated with codebase validation. A codebase is a source code repository or a set of repositories that share a common root. This codebase may be used to produce a number of releases that are destined for different environments. Validation engine 270 may be configured to validate that there one version of application 280 that is currently being tracked in software configuration management (SCM) system or deployment pipeline 240 in a version control system.

Factor 220B, also referred to as a second factor may be associated with ensuring that dependencies of application 280 are declared and isolated. In particular, validation engine 270 may be configured to validate that the dependent components of application 280 are not added in the codebase of application 280. Instead, the dependent components may be referred by application 280 using a library such as using a project object model (POM) file.

Factor 220C, also referred to as a third factor may be associated with verifying the configuration information of application 280 and its separation from the source code or codebase. This way, configuration information can be changed without redeploying application 280. Because traditionally configuration information may be stored in a properties file, validation engine 270 may be configured to determine that there is no properties file associated with application 280. Instead, validation engine 270 may also determine that a configuration file is stored in the environment and separate from the source code or codebase of application 280. Information regarding the location of the configuration file may be provided in a manifest file.

Factor 220D, also referred to as a fourth factor may be associated with validating backing services as bound resources to application 280. In particular, validation engine 270 may be configured to determine whether the backing services are utilized as bound resources by application 280. Validation engine 270 may also be configured to determine that the backing services are configurable so switching from one backing service can be performing by updating the configuration information in the configuration file. Backing services refer to systems that application 280 may rely on for its functionality, such as a database. In one example, validation engine 270 may verify that the backing services utilize a resource binding. The resource binding may include a username, a password, and a uniform resource locator (URL) that allows the application to consume the resource. In one embodiment, validation engine 270 may validate that the resource binding to a backing service is done via external configuration. In addition, validation engine 270 may call the backing service through an API with credentials stored in the configuration file. Validation engine 270 may be configured to validate front-loading activities such as fetching data is externalized into a backing service so that application 280 can be started and stopped without performing front-loaded operations.

Factor 220E, also referred to as a fifth factor may be associated with the separation of the build, release, and run stages of the application development. Validation engine 270 may be configured to validate that a single codebase of application 280 may be taken through the build process, release, and run stages. The build stage transforms the codebase into a compiled artifact. At the release stage, the compiled artifact is merged with configuration information that is external to the application to produce an immutable release. At the run stage, the immutable release is deployed to an environment and run. In one embodiment, validation engine 270 may ensure that developers cannot make code changes at runtime. In addition, validation engine 270 may also validate that every release has a unique release identifier, a timestamp, or a version control number. In addition, validation engine 270 may validate that any change to the codebase should generate a new release.

Factor 220F, also referred to as a sixth factor may be associated with the stateless nature of the processes supporting cloud-native applications. Validation engine 270 may be configured to validate that application 280 should execute as a single stateless process. For example, validation engine 270 may validate that application 280 does not wait for synchronization from a server when run.

Factor 220G, also referred to as a seventh factor may be associated with port bindings of application 280. Validation engine 270 may be configured to validate that application 280 is configured to export services via an environment-specific port binding without having to change code. Factor 220H, also referred to as an eighth factor may be associated with concurrency principle of application 280. Validation engine 270 may be configured to validate that application 280 can scale out via the process model. For example, validation engine 270 may validate that the application can dynamically scale the number of instances based on load, available memory in the platform, or another runtime telemetry.

Factor 220I, also referred to as the ninth factor may be associated with the disposability principle. Validation engine 270 may validate that the application can be started or stopped within a certain threshold. Factor 220J, also referred to as a tenth factor may be associated with parity between various environments, such as development, test, staging, and production environments. Validation engine 270 may be configured to validate that development environment 250, integration environment 255, and production environment 260 are as similar as possible. For example, validation engine 270 may verify the configuration and properties of the host such as available memory. This allows the developer to predict how the code change will behave in production.

Factor 220K, also referred to as the eleventh factor may be associated with log management of application 280. Validation engine 270 may be configured to validate that application 280 treats logs as event streams. In addition, validation engine 270 may validate that log storage, processing, and analysis are decoupled from application 280. This allows the ability to change how log storage and log processing are performed without modifying the application.

Factor 220L, also referred to as the twelfth factor may be associated with administrative processes in managing application 280. Validation engine 270 may validate that administrative/management processes associated with application 280 are run as one-off processes in pre-production environment 245 before deploying application 280 in production environment 260. Administrative processes include monitoring processes, backup and disaster recovery processes, etc.

Production validation suite 225 includes a factor 230A, a factor 230B, a factor 230C, a factor 230D, a factor 230E, a factor 230F, and a factor 230G. Factor 230A, also referred to as the thirteenth factor may be associated with the application being observable. Validation engine 270 may validate that application 280 provides visibility to information associated with performance, health, and various metrics.

Factor 230B, also referred to as the fourteenth factor may be associated with the schedulable principle. Validation engine 270 may be configured to validate that application 280 provides guidance on resource constraints. In one example, validation engine 270 may validate that a scheduling policy for application 280 is maintained. In another example, validation engine 270 may validate that application 280 can be coupled to a workload scheduler that can factor a number of criteria while deploying application 280.

Factor 230C, also referred to as the fifteenth factor may be associated with the application being upgradeable. Validation engine 270 may validate that application 280 can be upgraded or downgraded without service disruption. Factor 230D, also referred to as the sixteenth factor may be associated with the access control associated with application 280. Validation engine 270 may be configured to validate that application 280 is restricted to run using the least privileges. For example, validation engine 270 may validate that only the minimum required authority to perform tasks associated with application 280 is allowed to execute application 280.

Factor 230E, also referred to as the seventeenth factor may be associated with application 280 being auditable. Validation engine 270 may be configured to validate that information associated with requests for operations associated with application 280 such as what, when, who, and where the requests originated from can be identified. Factor 230F, also referred to as the eighteenth factor may be associated with the security of application 280. Validation engine 270 may be configured to validate authentication and authorization mechanisms implemented to secure application 280. For example, validation engine 270 may determine whether application 280 utilizes digital certificates. In addition, validation engine 270 may also validate that the endpoints of application 280 are secured with role-based access control. Factor 230G, also referred to as the nineteenth factor may be associated with the measurable principle of application 280. Validation engine 270 may be configured to validate that usage of application 280 is measurable via various metrics such as quota or chargebacks.

After validating application 280, validation engine 270 may transmit data associated with the performed validation to validation reporter 275. Validation engine 270 may also generate a score associated with application 280 based on the performed validation. In addition, validation engine 270 may also determine corrective action based on the score and/or whether application 280 passed or failed the validation.

Validation reporter 275 may be configured to generate a report based on the data received from validation engine 270. The report may indicate whether application 280 passed or failed the validation. In addition, the report may include a score associated with each of the validation factors. The score may be based on a percentage of adherence of application 280 to the DevOps principle associated with each validation factor. The score may be aggregated, wherein an overall score is determined and assigned to application 280. In addition, the report may include feedback associated with one or more corrective actions in case of validation failure.

The present disclosure provides a flexible architecture and may be configured to validate applications and platforms to determine whether the applications and the platform are cloud-ready. The applications may be written in various languages such as Java, .NET, Ruby, Python using validation module interface 265. The validation of the applications aids in accelerating the movement of application 280 through deployment pipeline 240 from development to deployment in one embodiment. In addition, the present disclosure may ensure that the applications adhere to the DevOps principles. Although the present disclosure shows 19 validation factors, the present disclosure may include more or fewer validation factors. In some embodiments, an administrator can use validation module interface 265 to view the validation factors. In addition, the administrator can use validation module interface 265 to add, edit, and/or delete validation factors in the validation suite. By ensuring that application 280 adheres to the cloud-native and DevOps practices, application 280 may be ensured to be portable, scalable, and resilient providing cost-savings to the application developer.

Validation module interface 265 may also display information associated with the validation suite, reports, corrective actions, application, etc. In another embodiment, validation module interface 265 may include a graphical user interface (GUI) which may be used to edit the information associated with the application, pre-production validation suite 215, production validation suite 225, validation engine 270, validation reporter 275, deployment pipeline 240, validation service, etc. Validation module interface 265 can also provide a user interface that allows users to provide configuration updates, request particular information, etc.

Figure 3:
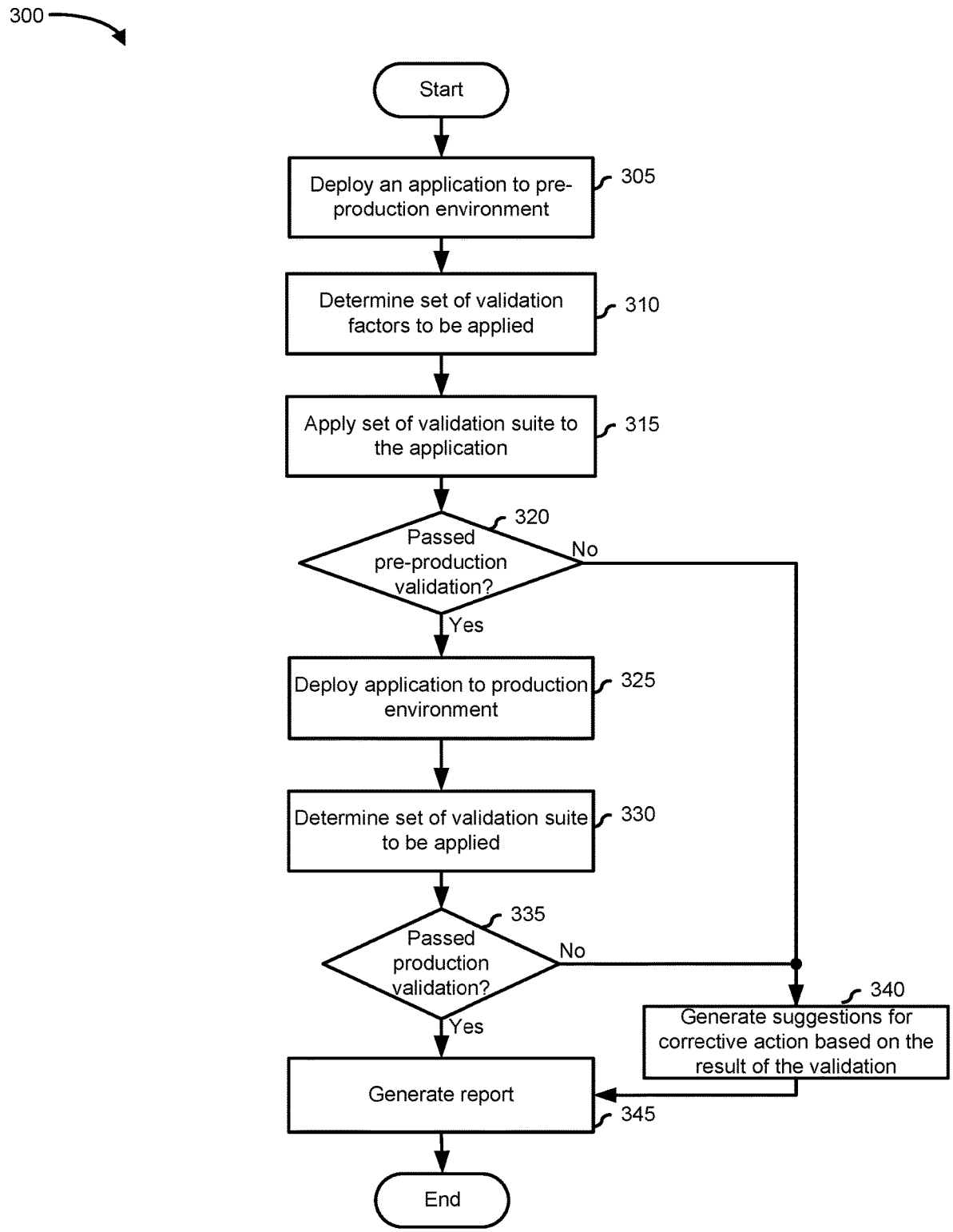
FIG. 3 is a flowchart illustrating an example of a method for validating cloud-native applications for a production ready deployment.

FIG. 3 illustrates a method 300 for performing validation on an application in a CI/CD pipeline which automates construction, testing, and deployment of the application. While embodiments of the present disclosure are described in terms of system management system 205 of FIG. 2, it should be recognized that other systems may be utilized to perform the described method. In particular, method 300 may be performed by one or more components of validation module 262. Embodiments of the present disclosure relate to the implementation and use of validation in the CI/CD pipeline to provide feedback on the production readiness of the application before its deployment in production. In particular, method 300 may validate, measure, track, and benchmark against desirable factors for successful application production deployment.

Method 300 typically starts at block 305 where an application is deployed to the pre-production environment of the CI/CD pipeline. The application, which may be containerized, may be identified via a name, a unique identifier, a version control identifier, etc. The identifiers may be the same across different environments allowing for tracking movement of the application through the CI/CD pipeline. Deployment of the application to the pre-production environment may trigger various processes which include validating the application against various validation factors based on cloud-native and DevOps practices. The method proceeds to block 310.

At block 310, the method determines the validation factors to be applied to the application. If the application is deployed in the pre-production environment, then the method may retrieve the pre-production validation suite from a repository. The method proceeds to block 315 where the method applies the pre-production validation suite to the application. The validation suite may include one or more validation factors. The validation suite and/or validation factors may be determined based on a service level agreement associated with the deployment and maintenance of the application in the cloud. In one embodiment, the validation factors are based on a project identifier that is associated with the service level and application identifier. In addition, the validation factors may be based on the environment where the application has been deployed. Before applying the pre-production validation suite, the method ensures that the application in the environment is the correct application to be validated based on the application identifier, version identifier, application name, etc.

Method 300 may verify that there is a single code repository or a set of repositories with a common root. In yet another embodiment, method 300 may verify that the codebase produces one application such as by verifying that there is a single launch script or point of execution. In addition, method 300 may validate environment variables based on a schema. Also, method 300 may validate that configuration such as API keys, services, and database credentials are not hardcoded. Instead of hardcoding the above variables, the application uses environment variables. The method proceeds to decision block 320.

At decision block 320, the method determines if the application in the pre-production environment passed the pre-production validation suite. If the application passed the pre-production validation suite, then the "YES" branch is taken, and the method proceeds to block 325. If the application failed the pre-production validation suite, then the "NO" branch is taken, and the method proceeds to block 340.

At block 325, the method deploys the application in the production environment. Deployment of the application in the production environment may trigger various processes which include validating the application against various validation factors based on cloud-native and DevOps practices. The validation factors may also be determined based on a service level agreement associated with the deployment and maintenance of the application in the cloud. In one embodiment, the validation factors are based on a project identifier that is associated with the service level and application identifier. In addition, the validation factors may be based on the environment where the application has been deployed.

The method proceeds to block 330 where the method determines the validation suite to be applied to the application in the production environment. If the application is deployed in the production environment, then the method may determine to apply a production validation suite to the application. The method may query the production validation suite from the repository based on the determination.

The validation suite may include production validation factors to support the operational integrity of the application from the perspective of a private cloud tenant by verifying operations that a tenant is likely to use. Such operations may include the ability to subscribe to any plan offered, the ability to consume the services that the private/hybrid cloud provides, such as deploying infrastructure, applications, and/or platforms as services.

The method proceeds to decision block 335 where the method determines whether the application passed the production validation suite. If the application passed the production validation suite, then the "YES" branch is taken, and the method proceeds to block 345. If the application failed the production validation suite, then the "NO" branch is taken, and the method proceeds to block 340.

At block 340, the method may determine and provide one or more suggestions to correct the issue and increase the compliance score of the application. Based on the score, the report may also include suggestions for one or more corrective actions. For example, if the application fails the first factor in the pre-production validation suite, then method may suggest implementing a version control system as a corrective action. In another example, if the application fails the second factor in the pre-production validation suite, then the method may suggest using a POM file. The method proceeds to block 345.

At block 345, the method may generate a report based on the result of the validation suites applied to the application. In addition, the method may assign a score associated with each of the factors in the validation suite. The score may be based on how code compliant the application is. For example, if the application is 100% compliant, then the score maybe 100%. The report may also include the corrective actions determined in block 340. The report may then be stored in a repository for further analysis.

Although FIG. 3 shows example blocks of method 300 in some implementation, method 300 and method 400 may include additional blocks, fewer blocks, different blocks, or differently arranged blocks than those depicted in FIG. 3. Additionally, or alternatively, two or more of the blocks of method 300 may be performed in parallel. For example, block 305 and block 310 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A computer-implemented method comprising:
    deploying a cloud-native application in a pre-production environment;
    determining a first validation suite of a plurality of validation suites, wherein the first validation suite is for the cloud-native application in the pre-production environment;
    in response to determining that the first validation suite is a pre-production validation suite, validating the cloud-native application in the pre-production environment using the pre-production validation suite that includes a first plurality of validation factors based on development and operations (DevOps) practices;
    when the cloud-native application passed the pre-production validation suite, then deploying the cloud-native application in a production environment;
    determining a second validation suite of the plurality of validation suites, wherein the second validation suite is for the cloud-native application in the production environment;
    in response to determining that the second validation suite is a production validation suite, validating the cloud-native application in the production environment using the production validation suite that includes a second plurality of validation factors based on the DevOps practices;
    assigning a score associated with each one of the first plurality of validation factors and each one of the second plurality of validation factors;
    determining whether the cloud-native application passed validation based on the score associated with the each one of the first plurality of validation factors and the each one of the second plurality of validation factors;

when the cloud-native application failed the validation, then generating a suggestion for one or more corrective actions;

generating a report that includes the suggestion for the one or more corrective actions and the score associated with each one of the first plurality of validation factors and the each one of the second plurality of validation factors; and displaying, via a graphical user interface, the report for viewing and editing information associated with the pre-production validation suite, the production validation suite, the one or more corrective actions, and the cloud-native application.

2. The method of claim 1, further comprising generating an overall score based on the score associated with the each one of the first plurality of validation factors and the each one of the second plurality of validation factors.

3. The method of claim 1, further comprising when the cloud-native application failed the pre-production validation suite, then generating a first corrective action based on a first failed validation factor of the first plurality of validation factors.

4. The method of claim 1, further comprising when the cloud-native application failed the production validation suite, then generating a second corrective action based on a second failed validation factor of the second plurality of validation factors.

5. The method of claim 1, further comprising validating a platform using the pre-production validation suite.

6. The method of claim 1, further comprising validating a platform using the production validation suite.

7. An information handling system, comprising:

a repository that stores plurality of validation suites that includes a pre-production validation suite and a production validation suite, wherein the pre-production validation suite includes a first plurality of validation factors, and wherein the production validation suite includes a second plurality of validation factors; and a processor configured to:

deploy a cloud-native application in a pre-production environment;

determine a first validation suite of the plurality of validation suites, wherein the first validation suite is for the cloud-native application in the pre-production environment;

in response to a determination that the first validation suite is the pre-production validation suite, validate the cloud-native application in the pre-production environment using the pre-production validation suite;

when the cloud-native application passed the pre-production validation suite, then deploy the cloud-native application in a production environment;

determine a second validation suite of the plurality of validation suites, wherein the second validation suite is for the cloud-native application in the production environment;

in response another determination that the second validation suite is the production validation suite, validate the cloud-native application in the production environment using the production validation suite;

assign a score associated with each one of the first plurality of validation factors and each one of the second plurality of validation factors that are based on development and operations (DevOps) practices;

determine whether the cloud-native application passed validation based on the score associated with the each one of the first validation factors and the each one of the second validation factors;

when the cloud-native application failed the validation, then generating a suggestion for one or more corrective actions;

generate a report that includes the suggestion for the one or more corrective actions and the score associated with each one of the first plurality of validation factors and the each one of the second plurality of validation factors; and displaying, via a graphical user interface, the report for viewing and editing information associated with the pre-production validation suite, the production validation suite, the one or more corrective actions, and the cloud-native application.

8. The information handling system of claim 7, wherein the processor is further configured to generate an overall score based on the score associated with the each one of the first plurality of validation factors and the each one of the second plurality of validation factors.

9. The information handling system of claim 7, when the cloud-native application failed the pre-production validation suite, then the processor is further configured to generate a first corrective action based on a first failed validation factor of the first plurality of validation factors.

10. The information handling system of claim 7, when the cloud-native application failed the production validation suite, then the processor is further configured to generate a second corrective action based on a second failed validation factor of the second plurality of validation factors.

11. The information handling system of claim 7, wherein the processor is integrated in a continuous integration and continuous delivery pipeline.

12. A non-transitory computer readable medium including code that when executed by a processor causes the processor to perform a method, the method comprising:

deploying a cloud-native application in a pre-production environment;

determining a first validation suite of a plurality of validation suites, wherein the first validation suite is for the cloud-native application in the pre-production environment;

in response to determining that the first validation suite is a pre-production validation suite, validating the cloud-native application in the pre-production environment using the pre-production validation suite that includes a first plurality of validation factors based on development and operations (DevOps) practices;

when the cloud-native application passed the pre-production validation suite, then deploying the cloud-native application in a production environment;

determining a second validation suite of the plurality of validation suites, wherein the second validation suite is for the cloud-native application in the production environment;

in response to determining that the second validation suite is the production validation suite, validating the cloud-native application in the production environment using a production validation suite that includes a second plurality of validation factors based on the DevOps practices;

assigning a score associated with each one of the first plurality of validation factors and each one of the second plurality of validation factors;

determining whether the cloud-native application passed validation based on the score associated with the each one of the first validation factors and the each one of the second validation factors;

when the cloud-native application failed the validation, then generating a suggestion for one or more corrective actions;

generating a report that includes the suggestion for the one or more corrective actions and the score associated with each one of the first plurality of validation factors and the each one of the second plurality of validation factors; and displaying, via a graphical user interface, the report for viewing and editing information associated with the pre-production validation suite, the production validation suite, the one or more corrective actions, and the cloud-native application.

13. The non-transitory computer readable medium of claim 12, wherein the report includes information on whether the cloud-native application passed or failed the validating in the pre-production environment and the validating in the production environment.

14. The non-transitory computer readable medium of claim 12, the method further comprising generating an overall score based on the score associated with the each one of the first plurality of validation factors and the each one of the second plurality of validation factors.

15. The non-transitory computer readable medium of claim 12, the method further comprising if the cloud-native application failed the pre-production validation suite, then generating a first corrective action based on a first failed validation factor of the first plurality of validation factors.

16. The non-transitory computer readable medium of claim 12, further comprising validating a platform using the pre-production validation suite.

17. The non-transitory computer readable medium of claim 12, further comprising validating a platform using the production validation suite.

* * * * *